US010614456B2

(12) United States Patent
Mokhasi

(10) Patent No.: US 10,614,456 B2
(45) Date of Patent: Apr. 7, 2020

(54) DYNAMIC CRYPTOCURRENCY ALIASING

(71) Applicant: Visa International Service Association, San Francisco, CA (US)

(72) Inventor: Gaurav Srikant Mokhasi, Bengaluru (IN)

(73) Assignee: Visa International Service Association, San Francisco, CA (US)

(*) Notice: Subject to any disclaimer, the term of this patent is extended or adjusted under 35 U.S.C. 154(b) by 773 days.

(21) Appl. No.: 15/240,931

(22) Filed: Aug. 18, 2016

(65) Prior Publication Data

US 2018/0053182 A1 Feb. 22, 2018

(51) Int. Cl.
*G06Q 20/38* (2012.01)
*H04L 29/06* (2006.01)
(Continued)

(52) U.S. Cl.
CPC ....... *G06Q 20/3829* (2013.01); *G06Q 20/065* (2013.01); *G06Q 20/367* (2013.01);
(Continued)

(58) Field of Classification Search
CPC .. G06Q 20/3829; G06Q 20/65; G06Q 20/367; G06Q 20/385; G06Q 2220/00; H04L 9/3239; H04L 9/3242; H04L 63/0407; H04L 63/06; H04L 63/126; H04L 2209/38; H04L 2209/42; H04L 2209/56; H04L 2209/80
(Continued)

(56) References Cited

U.S. PATENT DOCUMENTS 7,194,618 B1 * 3/2007 Suominen ............... G06F 21/64
713/155
8,964,971 B2 * 2/2015 Vanstone ............ G06F 17/2264
380/28
(Continued)

FOREIGN PATENT DOCUMENTS

KR 1020160035028 3/2016
KR 101628624 6/2016
WO 2017081534 5/2017

OTHER PUBLICATIONS ("Netki wants to Replace Bitcoin Addresses with Wallet Names", https://bitcoinmagazine.com/articles/netki-wants-replace-bitcoin-addresses-wallet-names-1429736009, Apr. 22, 2015, 6 pages) (Year: 2015).*

(Continued)

*Primary Examiner* — James D Nigh
(74) *Attorney, Agent, or Firm* — Kilpatrick Townsend & Stockton LLP

(57) ABSTRACT

Described herein is a system in which temporary aliases may be associated with, and maintained with respect to, cryptocurrency addresses. In some embodiments, the system enables a temporary alias to be used by a mobile application (e.g., a wallet application) in a cryptocurrency transaction. In some embodiments, temporary aliases may be assigned from a pool of procedurally-generated aliases. In some embodiments, the temporary alias may be valid for a predetermined amount of time or number of transactions. For example, the system may assign a new temporary alias to a cryptocurrency address for each transaction and/or after a predetermined amount of time has elapsed.

10 Claims, 6 Drawing Sheets

(51) Int. Cl.
*H04L 9/32* (2006.01)
*G06Q 20/36* (2012.01)
*G06Q 20/06* (2012.01)

(52) U.S. Cl.
CPC ......... *G06Q 20/385* (2013.01); *H04L 9/3239* (2013.01); *H04L 9/3242* (2013.01); *H04L 9/3247* (2013.01); *H04L 63/0407* (2013.01); *H04L 63/06* (2013.01); *H04L 63/126* (2013.01); *G06Q 2220/00* (2013.01); *H04L 2209/38* (2013.01); *H04L 2209/42* (2013.01); *H04L 2209/56* (2013.01); *H04L 2209/80* (2013.01)

(58) Field of Classification Search
USPC .......................................................... 705/71
See application file for complete search history.

(56) References Cited

U.S. PATENT DOCUMENTS

| 8,977,568 | B1 | 3/2015 | Schattauer et al. | |
|---|---|---|---|---|
| 2015/0363778 | A1* | 12/2015 | Ronca | G06Q 20/065 705/71 |
| 2016/0019536 | A1* | 1/2016 | Ortiz | G06Q 20/3221 705/67 |
| 2016/0092870 | A1* | 3/2016 | Salama | G06Q 20/367 705/71 |
| 2016/0092874 | A1 | 3/2016 | O'Regan et al. | |
| 2016/0119289 | A1* | 4/2016 | Jain | H04L 63/0281 726/12 |

OTHER PUBLICATIONS ("DigitalName alias API for any cryptocurrency", retrieved from http://web.archive.org/web/20160306222128/http://digitalname.org/, Mar. 6, 2016, 2 pages) (Year: 2016).*

PCT/US2017/042446, "International Search Report and Written Opinion", dated Oct. 24, 2017, 14 pages.

"Pseudonym Generator", Available Online at: https://web.archive.org/web/20160815052637/https://www.namegenerator.biz/pseudonym-generator.php, Aug. 15, 2016, 2 pages.

EP17841806.7, "Extended European Search Report", dated Aug. 6, 2019, 9 pages.

Malahov, "Bitalias | Aka Usernames for Bitcoin", Available online at: https://medium.com/bitalias-decentralized-naming-and-identity-service/bitalias-7b66bffed9d8#.ww4r3h4sn, Jun. 6, 2015, 3 pages.

* cited by examiner

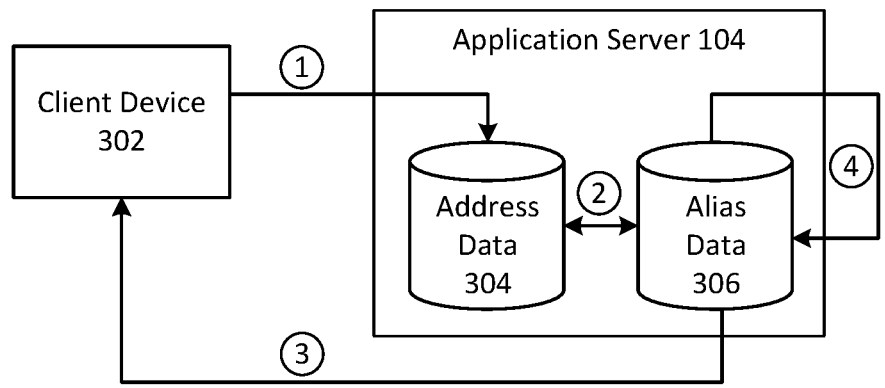
FIG. 3A
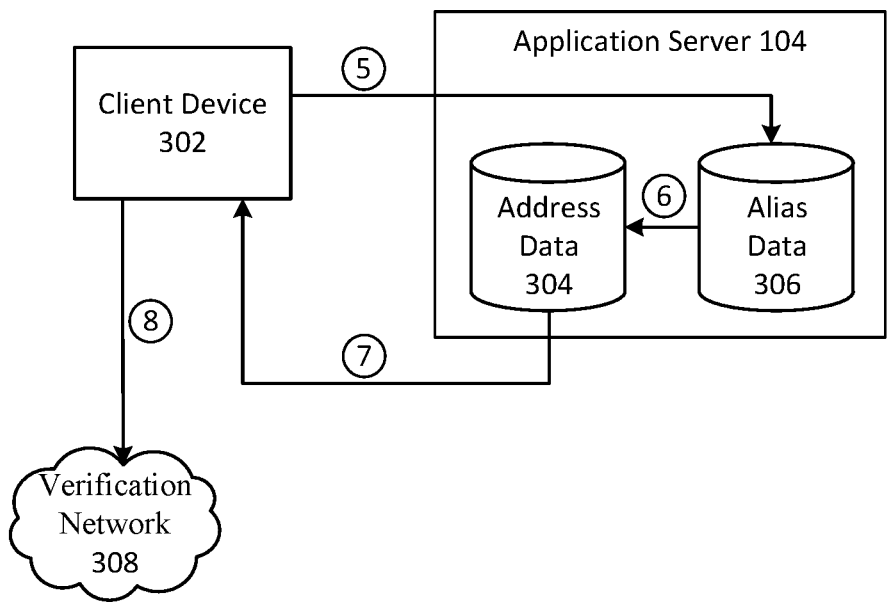
FIG. 3B
FIG. 3

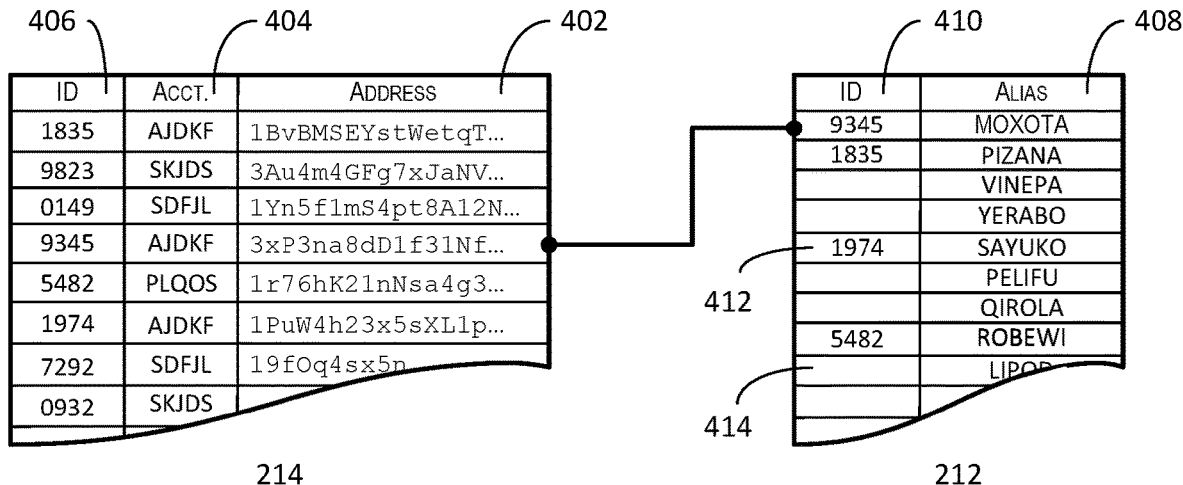
FIG. 4A
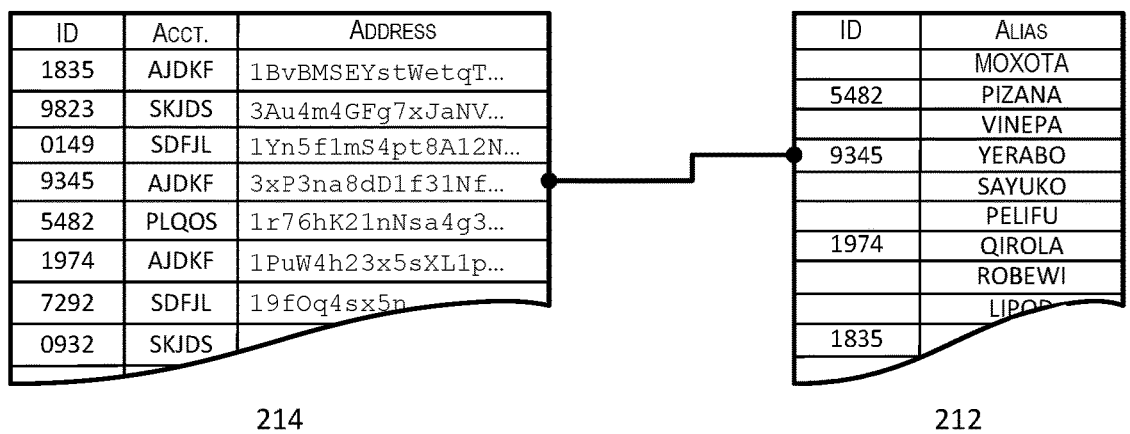
FIG. 4B
FIG. 4

DYNAMIC CRYPTOCURRENCY ALIASING

BACKGROUND

The use of various cryptocurrencies (e.g., Bitcoin, Ripple, Coinye, Litecoin, Peercoin, Namecoin, Dogecoin, Primecoin, Mastercoin, or any other suitable virtual currency) have been rapidly gaining in popularity in recent years. Cryptocurrencies are decentralized currencies (e.g., a currency that is not regulated by a central authority) that rely on principles of cryptography. A cryptocurrency is often implemented via a peer-to-peer system that includes a distributed environment for verifying transactions via a process known as "mining," in which a number of nodes compete to create a proof of work having a high hash-rate difficulty in exchange for a chance at receiving a small fee. The veracity of a cryptocurrency transaction is ensured using a public ledger called a blockchain, in which a record of all past transactions are stored and against which transactions may be verified.

Cryptocurrency transactions are usually conducted using mobile applications such as wallet applications. Users of such cryptocurrencies are usually very concerned with maintaining the privacy of their transactions. Although the use of wallet applications may increase the convenience of such transactions, their use may also enable other users to ascertain balances associated with that user's cryptocurrency addresses.

Embodiments of the invention address these and other problems, individually and collectively.

BRIEF SUMMARY

Embodiments of the disclosure are directed to a system in which temporary aliases may be associated with, and maintained with respect to, cryptocurrency addresses. The system enables a temporary alias to be used by a mobile application (e.g., a wallet application) in a cryptocurrency transaction. Temporary aliases may be assigned from a pool of procedurally-generated aliases. In some embodiments, the temporary alias may be valid for a predetermined amount of time or number of transactions. For example, the system may assign a new temporary alias to a cryptocurrency address for each transaction and/or after a predetermined amount of time has elapsed.

One embodiment of the invention is directed to a method that comprises receiving, from a client device, an indication of a cryptocurrency address associated with an account, associating the cryptocurrency address with the client device and a temporary alias, the temporary alias being selected randomly from a pool of temporary aliases, and providing the temporary alias to the client device associated with the cryptocurrency address. The method further comprises providing the cryptocurrency address to be used in the transaction to the second client device upon receiving a transaction request from a second client device that includes the temporary alias.

Another embodiment of the invention is directed to a server apparatus comprising a processor and a memory including instructions that, when executed with the processor, cause the server apparatus to receive, in relation to an account, an indication of a cryptocurrency address, correlate the cryptocurrency address to a temporary alias, the temporary alias being associated with one or more expiration conditions, such that the temporary alias is replaced by a different temporary alias upon determining that the one or more expiration conditions have been met, and provide the temporary alias to a client device associated with the account. The instructions further cause the server apparatus to, upon receiving the temporary alias within a transaction request, provide a response that includes the cryptocurrency address.

Another embodiment of the invention is directed to a mobile device comprising a processor and a memory including instructions that, when executed with the processor, cause the mobile device to receive user input that includes a cryptocurrency address, transmit the cryptocurrency address to an application server, and receive, in response to transmitting the cryptocurrency address to the application server, a temporary alias. In this embodiment, the temporary alias is associated with one or more expiration conditions, such that the temporary alias is replaced by a different temporary alias upon determining that the one or more expiration conditions have been met. The instructions further cause the mobile device to present the temporary alias on a display of the mobile device in a list of potential origination aliases, and upon receiving a selection of the temporary alias to complete a transaction: transmit the temporary alias to the application server; receive the cryptocurrency address; and generate a transfer request using the cryptocurrency address.

These and other embodiments of the invention are described in further detail below.

BRIEF DESCRIPTION OF THE DRAWINGS

FIG. 3 depicts an illustrative example of some processes that may be performed in accordance with at least some embodiments of the disclosure;

FIG. 3A depicts a process by which alias mappings may be created and/or renewed in accordance with at least some embodiments;

FIG. 3B depicts a process by which a cryptocurrency transaction may be conducted in accordance with at least some embodiments;

FIG. 4 depicts an illustrative example database transaction that may be implemented in accordance with at least some embodiments of the disclosure;

FIG. 4A depicts an initial state of an example table for an alias mapping database and an example table for a cryptocurrency address database;

FIG. 4B depicts a second state of an example table for an alias mapping database and an example table for a cryptocurrency address database;

DETAILED DESCRIPTION

Figure 1:
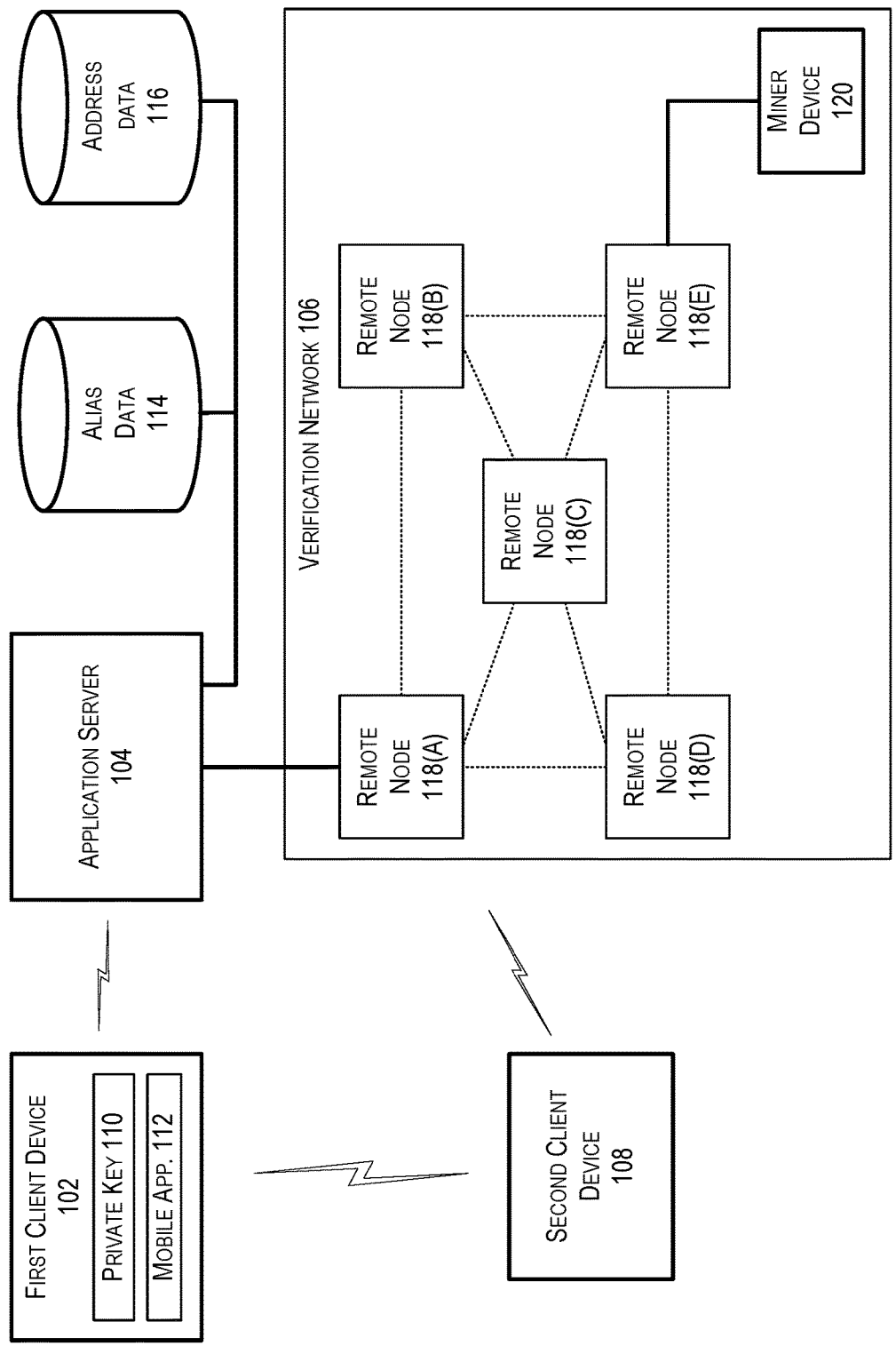
FIG. 1 depicts an example system in which aliases may be mapped to cryptocurrency addresses and subsequently used in transactions in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "alias" may be a false name intended to conceal a real identity. In some embodiments, an alias may be a substitute for a cryptocurrency address. An alias may comprise any string of characters, symbols, or images. Aliases may comprise actual strings of characters (e.g., dictionary words) or they may be procedurally generated. In some embodiments, an alias may be formatted according to a predetermined structure. In some embodiments, an alias may be mapped to a cryptocurrency address such that the recovery of the original cryptocurrency address from the alias may not be computationally derived. As described below, an alias may be a temporary substitute for the cryptocurrency address.

An "alias mapping" may be any mapped correlation between an alias and a real identify. In some embodiments, an alias mapping may be a mapped correlation between an alias and a cryptocurrency address. In some embodiments, an alias mapping may be represented by an identifier that is used to associate an entry or row of a cryptocurrency address database table with an entry or row of an alias mapping database table. An alias mapping may be temporary in nature. For example, an alias mapping may be associated with an expiration date, upon which the alias mapping is destroyed (e.g., the identifier is deleted from the row of the alias mapping table that includes the alias). In another example, the alias mapping may be destroyed when an application server receives a transaction request that includes the alias associated with the alias mapping, making each alias a one-time use alias.

An "application server" may be any computing device configured to provide remote support for a client device. The application server may be associated with a set of computer executable instructions to be installed on, and executed from, a client device (e.g., a mobile application). The application server may provide any suitable service and/or processing for the client device. For example, the application server may perform calculations on behalf of the client device. In some embodiments, the application server may maintain an account for one or more users. The application server may also store any protocols and/or user preferences related to the operation of the client device.

A "blockchain" may be a public ledger of transactions. In some embodiments, a blockchain may include a historical record of all transactions related to a particular cryptocurrency. A blockchain may be distributed to each node in a verification network, which may subsequently use the blockchain to provide verification of transactions. Transaction records in a blockchain may be stored as a series of "blocks," or permanent files that include a record of a number of transactions occurring over a given period of time. Blocks may be appended to a blockchain by a miner device after it completes the block and the block is validated.

A "client device" may be any electronic device capable of establishing a communication session with another electronic device (e.g., an application server) and transmitting/receiving data from that device. A client device may include the ability to download and/or execute mobile applications. Client devices may include mobile communication devices as well as personal computers and thin-client devices.

A "cryptocurrency" may be any digital currency in which encryption techniques are used to regulate the generation of units of currency and verify the transfer of funds, operating independently of a central bank A "cryptocurrency address" may be an address associated with a cryptocurrency. In some embodiments, a cryptocurrency address can be an alphanumeric identifier of any suitable length (e.g., 25-35 alphanumeric characters). A cryptocurrency address may be used to receive some amount of cryptocurrency. For example, each cryptocurrency address may be associated with a historical transaction recorded in a blockchain which indicates an amount transferred to that cryptocurrency address. Amounts associated with these transactions may be summed to determine a balance in cryptocurrency associated with that cryptocurrency address. Each cryptocurrency address may be generated using a hash of a public key of a public/private key pair. The corresponding private key may be used to sign transactions (e.g., transfer requests) from the cryptocurrency address. In some embodiments, cryptocurrency addresses may be created and/or destroyed. For example, each cryptocurrency address may be one-time use, in that each time a transaction uses a cryptocurrency address, that address is destroyed and a new one may be created. By way of illustration, a transaction may be conducted by transferring 2.5 bitcoins from a first cryptocurrency address that currently has 3.0 bitcoins to a second cryptocurrency address. In this example, the first cryptocurrency address may be left with a zero-balance and a new third cryptocurrency address may be created to store the overage amount of 0.5 bitcoins.

A "cryptographic key" may be any string of bits used by a cryptographic algorithm to transform plain text into cipher text or vice versa. Cryptographic key may include symmetric and asymmetric keys. A cryptographic key may be used to sign transactions and/or verify signed transactions. For example, a cryptocurrency transaction may be signed using a private key. The signed transaction may then be verified using a public key that corresponds to the private key.

A "miner device" may be any node in a verification network configured to verify transactions. A miner device may comprise any computing system or component, such as a device that includes a central processing unit, an application-specific integrated circuit (ASIC), or a field-programmable gate array (FPGA). The miner device may be configured to create new blocks to be added to the blockchain. Miner devices may be provided an incentive (e.g., a newly issued cryptocurrency or a transaction fee) to complete a block for the blockchain. In some embodiments, miner devices may be in competition with other miner devices to complete the block, with only the winning miner device being provided with the incentive.

A "mobile communication device" may be any portable electronic device that has a primary function related to communication. For example, a mobile communication device may be a smart phone, a personal data assistant (PDA), or any other suitable handheld device. The mobile communication device may be configured to input cryptocurrency addresses and display any received aliases. In some embodiments, the mobile communication device may be configured to store a private key to be associated with a cryptocurrency address and/or alias.

A "private key" is a type of cryptographic key that is kept secret by a party. A private key may be used to sign transactions such that they may be verified using the verification network.

A "public key" is a type of cryptographic key that is distributed to, or available to, the public. A public key may be made available to nodes of a verification network so that signed transactions associated with the public key may be verified by the nodes.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing. In cryptocurrency transactions, transactions may be signed using a private key and verified using a public key.

A "verification network" may be any set of nodes (computer systems and components) configured to provide verification for a transaction. The verification network may comprise a distributed computing environment utilizing several nodes that are interconnected via communication links, using one or more computer networks or direct connections. The verification network may be implemented over any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the verification network can be enabled by wired or wireless connections and combinations thereof. Nodes may be independently operated by third parties and may be added to, or removed from, the verification network on a continuous basis. In some embodiments, each of the nodes in a verification network may be miners devices.

Details of some embodiments of the present invention will now be described.

FIG. 1 depicts an example system in which aliases may be mapped to cryptocurrency addresses and subsequently used in transactions in accordance with at least some embodiments. In FIG. 1, a first client device 102 may be in communication with an application server 104. In some embodiments, the first client device 102 may also be in communication with a verification network 106, which may provide verification services related to the cryptocurrency. A number of other client devices (e.g., second client device 108) may also be in communication with the verification network 106. In some embodiments, the first client device 102 may be capable of communicating directly with the second client device 108.

The first client device 102 may comprise any suitable computing device capable of initiating and conducting cryptocurrency transactions. The first client device may include at least a processor and a memory. The memory of the first client device 102 may include a private key 110 that may be used to sign cryptocurrency transactions. The memory may also include computer-executable instructions that cause the processor to perform certain functions in accordance with embodiments of this disclosure. For example, the memory may include a mobile application 112 that causes the mobile device to communicate with an application server 104 to maintain alias/cryptocurrency address data and initiate transactions using that data. In some embodiments, mobile application 112 may be a wallet application.

The memory of the first client device 102 may include a secure execution environment such as a secure memory (e.g., Smartcard based technology available in low-power devices). In some embodiments, the secure memory may include a secure element. A secure element (SE) can be a tamper-resistant platform (typically a one chip secure microcontroller) capable of securely hosting applications and their confidential and cryptographic data (e.g. key management) in accordance with the rules and security requirements set forth by a set of well-identified trusted authorities. Sensitive information (e.g., the private key 110) received by the first client device 102 may be stored in the secure memory.

The first client device 102 may also establish a connection with an application server 104 that provides back end support for the first client device 102 by maintaining and managing alias mappings. In some embodiments, upon execution of the mobile application 112 the first client device 102 may transmit information related to a requested transactions to the application server 104. The application server 104 may retrieve alias mapping/cryptocurrency address information associated with the first client device 102 and may provide that information to the first client device 102. In this way, the information may be provided to the first client device 102 for each requested transaction. In some embodiments, the first client device 102 may transmit an identifier for the first client device 102 along with any transaction requests, such that the application server may identify account information stored in association with the first client device 102.

In some embodiments, the first client device 102 may include a communication interface configured to enable communication between the first client device 102 and another electronic device (e.g., application server 104, second client device 108, and/or a wireless router that manages access to verification network 106). Examples of a suitable communication interface may include radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. In some embodiments, the communication interface may include an infrared communication device. In some embodiments, the communication interface may include both long range and short range communication means. For example, the communication interface may include an antenna configured to connect to a cellular network in order to enable communication with various other components of the depicted architecture.

The application server 104 may comprise any suitable computing device capable of performing the operations described herein. An example of an application server 104 that may be implemented in accordance with various embodiments is described in greater detail with respect to FIG. 2. As described with respect to FIG. 2, the application server may maintain alias mapping data 114 and/or cryptocurrency address data 116. In some embodiments, alias mapping data 114 and/or cryptocurrency address data 116 may be maintained by a third-party entity (e.g., an entity unaffiliated with the application server 104). In some embodiments, the application server 104 may be configured to receive information (such as transaction requests) from the first client device 102, perform processing on behalf of the first client device 102, and/or provide cryptocurrency addresses and/or aliases to the first client device 102. The application server 104 may receive cryptocurrency addresses from the first client device 102 and may subsequently store the received cryptocurrency addresses in an address database 116. The cryptocurrency addresses stored in address database 116 may be mapped to an alias in an alias database 114. The alias associated with a cryptocurrency address received by the application server 104 may then be provided to the first client device 102. Upon receiving a transaction request that includes the alias (e.g., from the second client device), the application server may provide the cryptocurrency address associated with the alias in response to the received request.

A verification network 106 may comprise a distributed environment implemented across number of remote nodes 118 (A-E), each of which represents a computing system or component. A copy of a blockchain (a public ledger of cryptocurrency transactions) may be distributed to each remote node 118 within the verification network 106. Additionally, one or more of the remote nodes 118 may act as a miner device 120, and may compete to verify transaction records.

In an example cryptocurrency transaction, ownership of an amount of cryptocurrency is transferred from one cryptocurrency address to another cryptocurrency address. To authenticate the transaction, the transaction recording the transfer is signed by the originating party using a private key associated with that originating party. The signed transaction is then broadcast across the verification network 106, where it may be verified using the public key associated with the originating party.

During the verification process, the transaction is picked up by a miner device 120, verified using the public key, timestamped, and added to a "block" that includes a record of a number of other cryptocurrency transactions occurring within roughly the same period of time. A number of miner devices 120 that picked up the transaction then compete to solve a cryptographic puzzle. In particular, the miner devices 120 may compete to identify a nonce value that, when used with a hash function, results in a value formatted in a specific way. Upon solving the puzzle, the miner device 120 creates a proof of work that is then verified and (if the solution is valid) added to the blockchain ledger. The "winning" miner device 120 may be rewarded with a transaction fee or a newly minted amount of cryptocurrency.

Completed blocks are added to the blockchain ledger to form a permanent public record of all cryptocurrency transactions. The blockchain ledger is promulgated to multiple remote nodes 118 within the verification network 106. In the event that a user tries to double-spend an amount of cryptocurrency, the first transaction conducted using the cryptocurrency address will promulgate to remote nodes 118 faster than any subsequently conducted transaction using the same cryptocurrency address. This allows more time for additional blocks to be added to the blockchain that includes the first transaction. In this scenario, a node that receives two separate chains that include blocks with transactions originating from the same cryptocurrency address will choose the longest chain, which should be associated with the first conducted transaction.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications policy.

Figure 2:
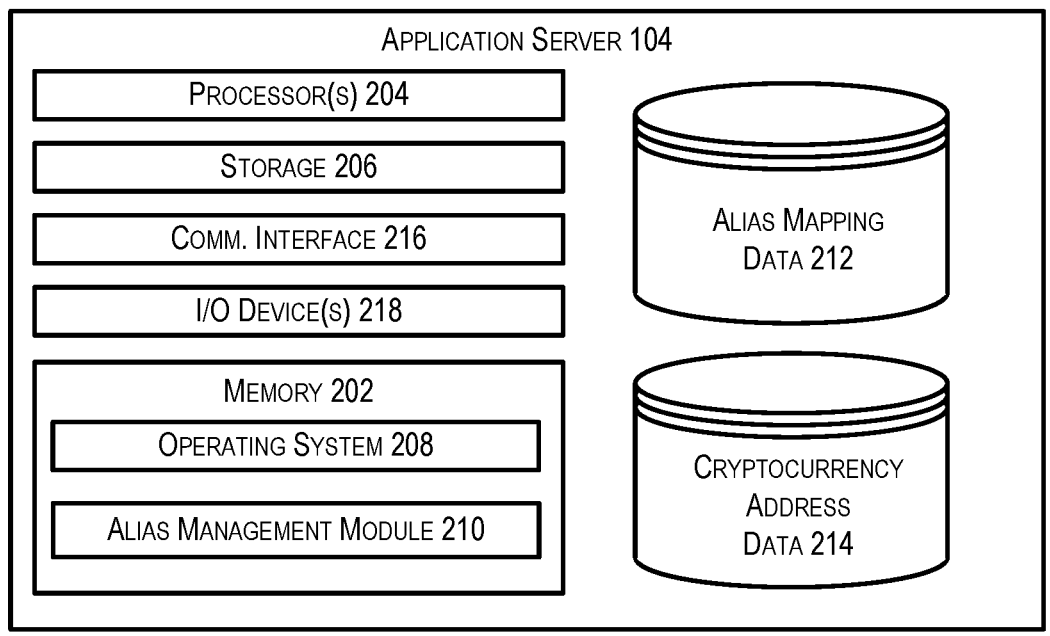
FIG. 2 depicts an example application server configured to maintain cryptocurrency addresses and provide alias mappings in accordance with at least some embodiments.

FIG. 2 depicts an example application server 104 configured to maintain cryptocurrency addresses and provide alias mappings in accordance with at least some embodiments. The application server 104 may be an example application server 104 of FIG. 1.

The application server 104 may be any type of computing device capable of receiving cryptocurrency addresses, providing aliases associated with the cryptocurrency addresses, and responding to transactions that involve the maintained aliases. In at least some embodiments, the application server 104 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of application server 104, the memory 202 may be volatile (such as random access memory (RAM)) and/or non-volatile (such as read-only memory (ROM), flash memory, etc.). The application server 104 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the application server 104. In some embodiments, the memory 202 may include multiple different types of memory, such as static random access memory (SRAM), dynamic random access memory (DRAM) or ROM.

Turning to the contents of the memory 202 in more detail, the memory 202 may include an operating system 208 and one or more application programs or services for implementing the features disclosed herein including at least a module for providing alias mappings to a client device associated with a cryptocurrency address (alias management module 210). The memory 202 may also include alias mapping data 212, which provides data associated with a pool of aliases assignable to cryptocurrency addresses, as well as cryptocurrency address data 214, which provides information on cryptocurrency addresses associated with client devices.

In some embodiments, the alias management module 210 may, in conjunction with the processor 204, be configured to assign and manage aliases associated with cryptocurrency addresses. In some embodiments, the alias management module 210 may include computer-executable instructions that cause the application server 104 to cycle aliases. For example, each mapping of an alias to a cryptocurrency address may be temporary, in that the mapping is destroyed upon certain conditions being met. In some embodiments, an alias mapping may be destroyed after a predetermined period of time has elapsed since the initial mapping was created. For example, each alias mapping may be associated with an expiration time. In this example, upon determining that the expiration time for the alias mapping has been exceeded, the alias associated with that alias mapping may be destroyed and a new alias may be mapped to the cryptocurrency address associated with the alias mapping. In some embodiments, the alias associated with an alias mapping may be released upon receiving a transaction request that includes the alias. This would effectively make the alias a one-time-use alias. In some embodiments, the alias mapping may be associated with multiple conditions. For example, the alias mapping may be destroyed upon receiving a transaction request that includes the alias or upon determining that the expiration time for the alias mapping has been exceeded.

In some embodiments, the alias management module 210 may, in conjunction with the processor 204, also be configured to manage transactions associated with alias mappings. In some embodiments, the alias management module 210 may include computer-executable instructions that cause the application server 104 to receive transaction requests associated with particular aliases and provide cryptocurrency addresses in response. For example, upon receiving a transaction request for a specific alias, the application server 104 may query the alias mapping data 212 for an identifier associated with the alias. The identifier may then be mapped to a cryptocurrency address stored within a cryptocurrency address data 214.

The application server 104 may also contain communications interface(s) 216 that enable the application server 104 to communicate with a stored database, another computing device or server, one or more remote devices, other application servers, and/or any other suitable electronic devices. In some embodiments, the communication interface 216 may enable the application server 104 to communicate with other electronic devices on a network (e.g., on a private network). The application server 104 may also include input/output (I/O) device(s) and/or ports 218, such as for enabling connection with a keyboard, a mouse, a pen, a voice input device, a touch input device, a display, speakers, a printer, etc.

FIG. 3 depicts an illustrative example of some processes that may be performed in accordance with at least some embodiments of the disclosure. FIG. 3 is depicted as FIG. 3A and FIG. 3B to better illustrate separate processes that may be implemented. It should be noted that these figures represent a simplified version of some embodiments of the disclosure and are intended to be non-limiting. In FIG. 3, a client device 302 may be in communication with an application server 104 and/or a verification network 308.

FIG. 3A depicts a process by which alias mappings may be created and/or renewed in accordance with at least some embodiments. In FIG. 3A, a user may add a cryptocurrency address to his or her account maintained by the application server 104. For example, at step 1 of the process depicted in FIG. 3A, a client device 302 may provide the cryptocurrency address to the application server 104 via a communication channel. In this example, the application server 104 may then store the received cryptocurrency address within an address data store 304.

Once the cryptocurrency address is received from the client device 302 by the application server 104, the application server 104 may assign a temporary alias to the cryptocurrency address from the address data 304 at step 2. In some embodiments, the alias data 306 may include a pool of predetermined aliases. In some embodiments, the aliases for the pool may be randomly generated. The aliases may be structured in a specified format. For example, the addresses may be structured in a format that is easily pronounceable or memorable, such as a series of consonant—vowel pairs. The application server 104 may randomly assign the cryptocurrency address to an alias within the alias data 306 that is not currently in use.

Once the cryptocurrency address has been stored in the address data 304 and an alias in the alias data 306 has been mapped to the cryptocurrency address, the mapped alias may be provided to the client device 302 at step 3. In some embodiments, the alias may be provided in a response to the received cryptocurrency address. In some embodiments, the alias may be provided to the client device 302 in a push notification to a wallet application installed on, and executed from, the client device 302.

In some embodiments, the application server 104 may be configured to refresh or circulate aliases assigned to cryptocurrency addresses at step 4. For example, alias mappings may be set to expire within a predetermined amount of time. In this example, upon expiration of the alias mapping, the cryptocurrency address of the expired alias mapping may be mapped to a new alias. In another example, an alias mapping may be expired upon its use. For example, upon receiving a transaction request that includes the alias (described in more detail below), the cryptocurrency address mapped to that address may be mapped to a new alias.

FIG. 3B depicts a process by which a cryptocurrency transaction may be conducted in accordance with at least some embodiments. In FIG. 3B, the application server 104 may receive a transaction request from a client device related to one or more alias mappings at step 5. For example, the client device may transmit a request for a cryptocurrency address associated with the client device (e.g., a cryptocurrency address from which funds should originate), a cryptocurrency address associated with a different client device (e.g., a cryptocurrency address to which funds should be sent), or both. The application server, upon receiving the transaction request, may query the alias data 306 to determine an identifier currently associated with the alias.

Upon determining at least one identifier associated with the alias, the application server 104 may identify at least one cryptocurrency address to return to the client device 302 at step 6. In some embodiments, the application server 104 may query the address data 304 for the determined identifier. Upon identifying the appropriate cryptocurrency address, the application server 104 may communicate the identified cryptocurrency address to the client device 302 at step 7.

Upon receiving the cryptocurrency address in response to the transaction request, the client device 302 may sign the transaction and provide it to the verification network 308 to be processed. In some embodiments, upon providing the cryptocurrency address to the client device 302, the application server may expire the alias mapped to the provided cryptocurrency address, create a new alias mapping for the cryptocurrency address, and provide the new alias to the client device 302.

FIG. 4 depicts an illustrative example database transaction that may be implemented in accordance with at least some embodiments of the disclosure. For illustrative purposes, FIG. 4 is depicted as FIG. 4A and FIG. 4B. It should be noted that these figures represent a simplified version of some embodiments of the disclosure and are intended to be non-limiting. In FIG. 4, two example database tables are presented representing an example embodiment of a table for an alias mapping database 212 and an example embodiment of a table for a cryptocurrency address database 214. Each of these tables are examples of the respective alias mapping database 212 and cryptocurrency address database 214 depicted in FIG. 2.

FIG. 4A depicts an initial state of an example table for an alias mapping database 212 and an example table for a cryptocurrency address database 214. As depicted, each row of the table for the cryptocurrency address database 214 may be mapped to a row of the table for the alias mapping database 212. Accordingly, the table for the alias mapping database 212 would include a number of rows greater than or equal to the number of rows in the cryptocurrency address database 214. Accordingly, in some embodiments, as the number of rows in the table for the cryptocurrency address database 214 approaches the number of rows in the table for the alias mapping database 212, additional rows may be added to the table for the alias mapping database 212. For example, new aliases may be generated and rows may be appended to the table for the alias mapping database 212.

In this example, a table for a cryptocurrency address database 214 may include at least a column of cryptocurrency addresses 402 and a column that includes an indication of an account or client device associated with each cryptocurrency address (e.g., an account column 404). In addition, the table for the cryptocurrency database 214 may include an identifier column 406 that includes an identifier that may be used to map each row to a corresponding alias in the alias mapping database 212. In some embodiments, the identifier column may represent a primary key column for the cryptocurrency address database 214. It should be noted that the table for the cryptocurrency address database 214 may include a number of additional columns.

The table for the alias mapping database 212 may include at least an alias column 408. In some embodiments, the table for the alias mapping database 212 may include an "in-use" column that may be flagged to indicate that an alias is currently assigned. However, some embodiments of the disclosure may not include this column. For example, in some embodiments, the table for the alias mapping database 212 may include a column of identifiers 410 that includes either an identifier entry (e.g., 412) or a null entry (e.g., 414) for each row. In this example, a null entry may indicate to the application server that the alias is currently available, whereas an identifier entry may map to a corresponding identifier in the identifier column 406 of the table for the cryptocurrency address database 214. Accordingly, each non-empty entry depicted in the identifier column 410 may represent an alias mapping associated with the alias entry (in the alias column 408) within the same row.

In some embodiments, the table for the alias mapping database 212 may also include a column of timestamps. These timestamps may represent a time at which the alias mapping was created or, alternatively, a time at which the alias mapping will expire. It should also be noted that the table for the alias mapping database 212 may include a number of additional columns (e.g., a column of primary keys, etc.).

FIG. 4B depicts a second state of an example table for an alias mapping database 212 and an example table for a cryptocurrency address database 214. In FIG. 4B, each of the alias mappings depicted in FIG. 4A have been destroyed and new alias mappings have been created. For example, in FIG. 4A the alias "MOXOTA" was mapped to the cryptocurrency associated with identifier 9345, whereas in FIG. 4B the alias "YERABO" was mapped to the cryptocurrency associated with identifier 9345. Accordingly, the identifiers are shifted randomly, such that each cryptocurrency address stored in the table for the cryptocurrency address database 214 may be given a "new" alias.

It should be noted that an alias mapped to one cryptocurrency address may later be mapped to another cryptocurrency address. Each alias in the alias column 408 may be used multiple times by multiple parties (though only by one party at any given time). The aliases themselves may be procedurally generated. For example, a pool of aliases may be created by randomly constructing a series of consonant-vowel pairs (e.g., three random consonant-vowel pairs in a row). In this example, duplicate aliases may be removed from the pool and regenerated. Once the pool has been created, each of the aliases in that pool may be appended to the table for the alias mapping database 212.

It should also be noted that a cryptocurrency address may be a single-use address. In this scenario, the cryptocurrency address database table 214 may be updated with a new cryptocurrency address upon completion of a transaction. For example, if a first cryptocurrency address is used to transfer a balance of cryptocurrency to a second cryptocurrency address, then the total balance of the first cryptocurrency address may be set to zero, despite the amount of the transaction. In this scenario, the owner of the first cryptocurrency address may be provided a third cryptocurrency address that is associated with any overage paid to the second cryptocurrency address (e.g., change). In this scenario, the application server may delete the entry with the first cryptocurrency address in the cryptocurrency address database table and may create a new entry for the third cryptocurrency address.

The above figure provides an example of one potential implementation. This example is provided for illustrative purposes only and it should be noted that one skilled in the art would recognize a number of equivalent ways in which embodiments of the disclosure may be implemented. For example, in some embodiments, multiple tables may be used. In another example, some embodiments may use a single table.

Figure 5:
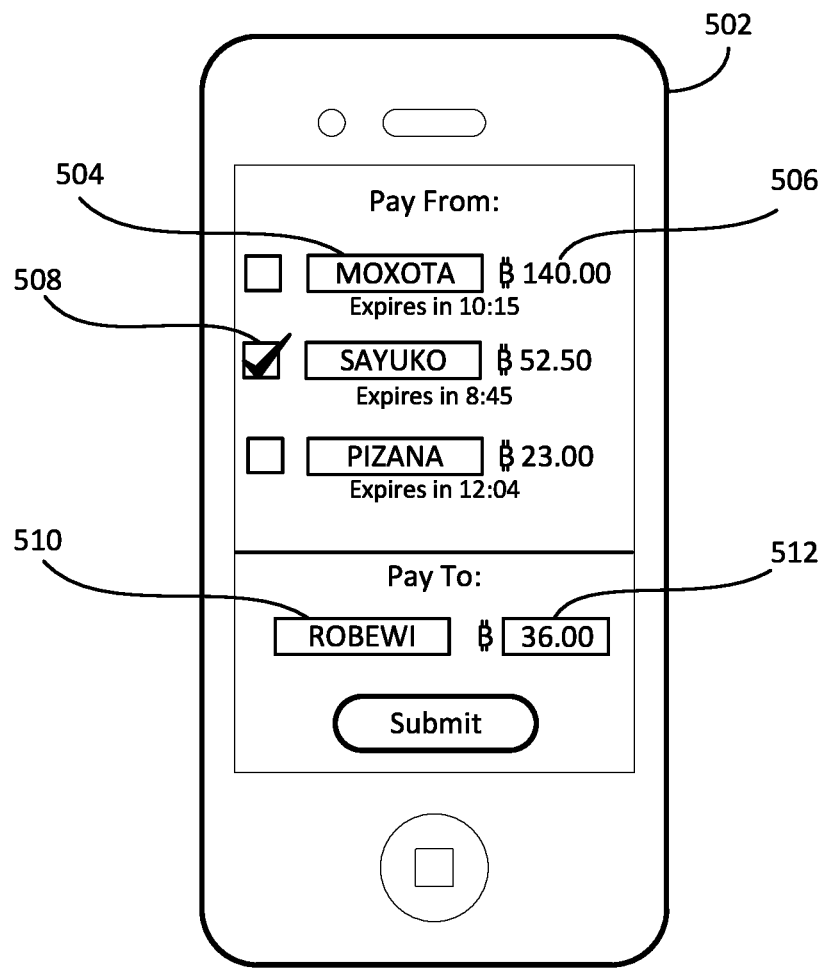
FIG. 5 depicts an illustrative example of a wallet application that may be implemented in accordance with embodiments of the disclosure.

FIG. 5 depicts an illustrative example of a wallet application that may be implemented in accordance with embodiments of the disclosure. In some embodiments, a client device may be a mobile communication device that includes a mobile application (e.g., a wallet application) installed on, and executed from, the mobile communication device. The mobile application may include a graphical user interface (GUI) that when executed, presents a user of the mobile communication device with a number of features that may be implemented in accordance with embodiments of the disclosure.

In some embodiments, the mobile communication device may be associated with an account maintained by an application server. Each mobile communication device may be associated with one or more cryptocurrency addresses. The mobile communication device may communicate an identifier associated with that mobile communication device to the application server, which may identify relevant cryptocurrency addresses based on that identifier (e.g., via account column 404 depicted in FIG. 4). The application server may analyze transaction history written to a blockchain ledger in relation to the identified relevant cryptocurrency addresses in order to determine a balance associated with those cryptocurrency addresses. In some embodiments, the application server may update a balance associated with each cryptocurrency address each time that a new transaction is detected in a blockchain for each cryptocurrency address.

In some embodiments, the application server may provide the mobile communication device with aliases mapped to each of the identified cryptocurrency addresses associated with the mobile communication device (e.g., origination aliases 504). The mobile application may be configured (via the mobile application) to display the provided origination aliases 504 on the GUI as well as balances 506 associated with the provided origination aliases 504. An origination alias 504 may be selected via a selected alias indicator 508. Aliases 504 may be selected in order to identify a cryptocurrency address from which a payment may be provided. Additionally, a user may provide a displayed origination alias to another party so that the other party may complete a transaction by submitting a transaction request that includes the provided alias. In some embodiments, multiple origination aliases 504 may be selected by a user of the mobile communication device from which to originate funds.

In some embodiments, the GUI may provide a user with the ability to enter a target alias into an alias input field 510 to be associated with a transaction. In some embodiments, the user may be provided with the ability to enter a cryptocurrency address instead of an alias. This may allow a user with the mobile application to conduct transactions using cryptocurrency addresses not associated with an alias. In addition, a user may be provided the ability to specify a transaction amount (e.g., via an amount input field 512) to be transferred to a cryptocurrency account associated with the provided alias.

In accordance with at least some embodiments of the disclosure, a user of the mobile communication device may select one or more available aliases 504 via their respective selected alias indicator 508. The user may then enter an alias into the alias input field 510 as well as an amount into the amount input field 512. Upon electing to submit the transaction, the mobile communication device may communicate the selected origination alias 504 and/or the target alias to an application server. Upon receiving each of the aliases, the application server may query the aliases and return corresponding cryptocurrency addresses in a response. To complete the transaction, the mobile communication device may generate a transaction that includes each of the associated cryptocurrency addresses, sign the transaction using a private key, and provide the signed transaction to a verification network.

Upon receiving an indication that the transaction has been provided to the verification network (e.g., that a record of the transaction has been added to the blockchain), the application server may expire each of the aliases that were involved in the transaction, select new aliases to be mapped to each of those aliases, and provide the new aliases to any relevant client devices.

Figure 6:
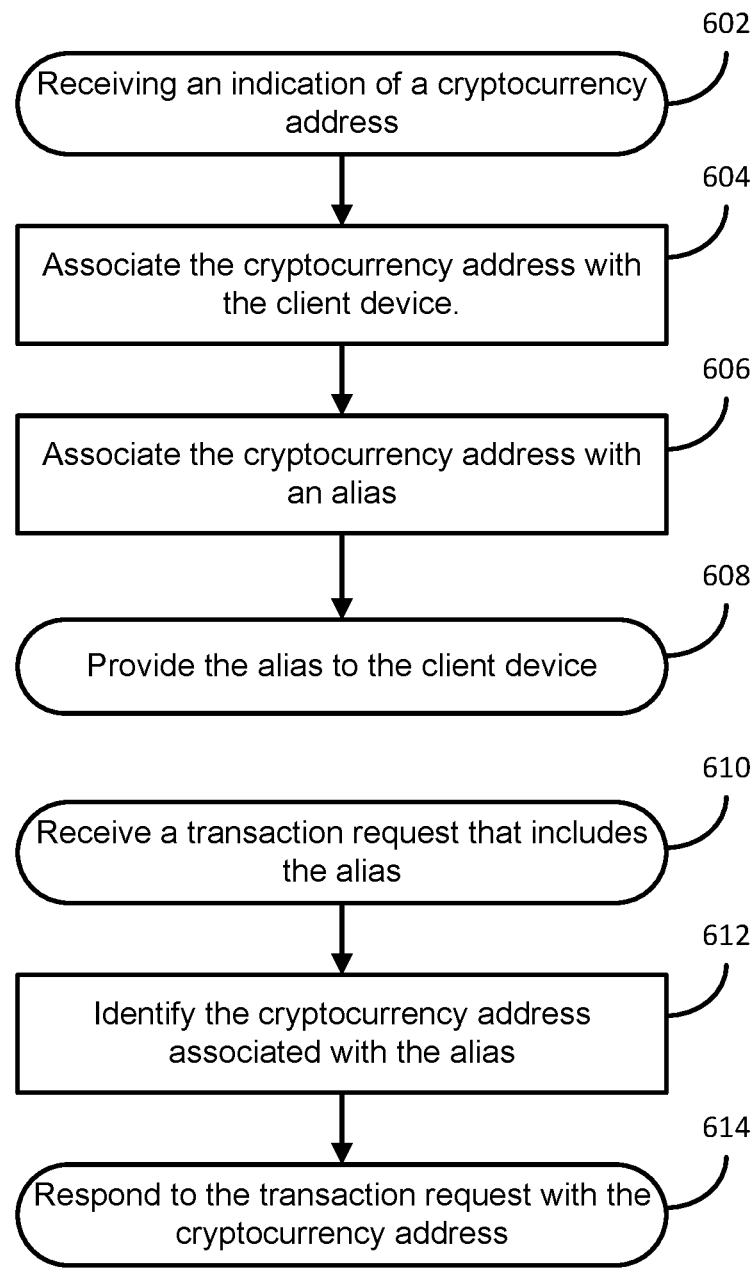
FIG. 6 depicts an example process for providing a temporary alias and conducting a transaction using the temporary alias in accordance with at least some embodiments.

FIG. 6 depicts an example process for providing a temporary alias and conducting a transaction using the temporary alias in accordance with at least some embodiments. Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by at least the application server depicted in FIG. 1 and FIG. 2. The code may be stored on a computer-readable storage medium, for example, in the form of a computer program including a plurality of instructions executable by one or more processors. The computer-readable storage medium may be non-transitory.

Process 600 may begin at 602, when an indication of a cryptocurrency address is received by an application server in relation to an account and/or client device. In some embodiments, the application server may also receive an indication of a private key to be stored in association with a received cryptocurrency address. In some embodiments, a private key associated with the cryptocurrency address may be stored on a client device, but not provided to the application server.

Upon receiving the indication of the cryptocurrency address, the application server may store it in association with the client device at step 604. In some embodiments, a user of the client device may log into an account maintained by the application server and provide a cryptocurrency address. For example, a user may download an application supported by the application server, enroll his or her mobile communication device with the application server, and provide a number of cryptocurrency addresses to be associated with his or her account. In some embodiments, a user may log into an account maintained by the application server on a first client device and enroll the cryptocurrency address with a second client device. For example, a user may log into an account maintained by the application server using a personal computer and any provided cryptocurrency address may be associated with a mobile communication device associated with the account.

At step 606, the application server may associate each received cryptocurrency address with a temporary alias. For example, the received cryptocurrency address may be stored in a cryptocurrency address database table as described earlier in this disclosure. Each cryptocurrency address entry of the cryptocurrency address database table may then be associated with an alias in an alias database table. In some embodiments, this may comprise populating an entry in the same row as the alias within the alias mapping database table with an identifier for the cryptocurrency address.

At step 608, each temporary alias mapped to the cryptocurrency addresses may be provided to its associated client device. In some embodiments, the alias may be provided to a mobile communication device as a push notification. In some embodiments, when a mobile application installed on a mobile communication device is executed, the mobile application may be configured to cause the mobile communication device to request any aliases that it is currently associated with.

At step 610, the application server may receive a transaction request that includes a temporary alias. In some embodiments, the transaction request may include multiple aliases. For example, the transaction request may include a number of origination aliases (i.e., aliases associated with cryptocurrency addresses from which funds are to originate) and a target alias (i.e., an alias associated with a cryptocurrency address to which funds should be provided).

At step 612, the application server may identify any cryptocurrency addresses associated with the received aliases. For example, the application server may query an alias mapping database to identify any identifiers currently associated with each of the received aliases. The application server may then query a cryptocurrency database table for cryptocurrency addresses associated with the identified identifiers.

At step 614, the application server may respond to the received transaction request by providing the identified cryptocurrency address. In some embodiments, the received transaction request and/or the response provided may be formatted according to a specified format. In some embodiments, a separate transaction request may be received for each alias. For example, if a transaction to be completed involves two origination aliases and a target alias, then the application server may receive three separate transaction requests and may provide three separate responses.

Embodiments of the invention provide for a number of technical advantages. For example, users are provided with a series of temporary aliases for use in their transactions. In this way, the fact that anyone can be assigned a particular alias at any time, paired with the absence of records, creates a system in which anonymity is maintained while providing a user the ability to use aliases (i.e., without requiring a user to use the cryptocurrency address) during transactions. Additionally, in some embodiments, the client device may be in possession of the private key along with an alias, but not the cryptocurrency address itself. This makes the cryptocurrency more secure, in that the cryptocurrency address and private key are not stored in the same place. There is also less risk of fraud related to the wallet application, as the application server may never be provided with the private key. Additionally, in systems that use embodiments of the disclosure, users are provided with an easy-to-use, easy-to-enter, alias for each cryptocurrency address. This is advantageous in that typical cryptocurrency addresses are often lengthy and hard to recall/enter. When a mistake is made in entering a cryptocurrency address, this may often result in payment to the wrong person. Since cryptocurrency transactions are usually non-refundable, it would be advantageous to use embodiments of the disclosure to reduce potential errors in entering cryptocurrency addresses.

At the same time, users of the wallet application are unable to gain possession of the cryptocurrency address from its use, as the cryptocurrency address may never even be displayed. In this way, unauthorized parties are prevented from knowing which cryptocurrency addresses belong to any particular user, and are hence unable to view blockchain ledgers related to those cryptocurrency addresses. This adds privacy to transactions, in that it prevents an unauthorized party from obtaining a balance or net worth associated with a user of the wallet application. For example, if User A is asked to pay User B at a specified cryptocurrency address, then User A would typically be able to review the blockchain to determine a total balance associated with that cryptocurrency address. This problem is solved by the current disclosure, in which User A would never be provided with the cryptocurrency address, but would be provided the temporary alias instead.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although the described embodiments mention the use of tokens for purchase transactions, tokens can also be used to access data or other services. For example, multiple people may have tickets or other access credentials used to gain access to a location or service (e.g., a train ride or concert). In this example, the tickets for the multiple people may be aggregated under a single master token.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, from a client device, an indication of a cryptocurrency address associated with an account;
   associating the cryptocurrency address with the client device and a temporary alias, the temporary alias being selected randomly from a pool of temporary aliases;
   providing the temporary alias to the client device associated with the cryptocurrency address, such that the temporary alias is caused to be presented on a display of the client device within a list of potential origination aliases, the temporary alias further caused to be selectable by a user of the client device for transmission to a second client device;
   upon receiving a transaction request from the second client device that includes the temporary alias, retrieving the cryptocurrency address and initiating the transaction by generating a transfer request related to the cryptocurrency address and an account associated with the second client device.

2. The method of claim 1, wherein the temporary alias is only valid until predetermined conditions have been met.

3. The method of claim 2, wherein a new temporary alias is associated with the cryptocurrency address upon determining that the temporary alias is no longer valid.

4. The method of claim 3, wherein the new temporary alias is pushed to the mobile device, wherein the mobile device is caused to replace the temporary alias with the new temporary alias.

5. The method of claim 2, wherein the predetermined conditions comprise an expiration date.

6. The method of claim 2, wherein the predetermined conditions comprise a number of transactions using the temporary alias.

7. A client device comprising:
one or more processors; and
a memory including instructions that, when executed by the one or more processors, cause the client device to:
receive user input that includes a cryptocurrency address;
transmit the cryptocurrency address to an application server;
receive, in response to transmitting the cryptocurrency address to the application server, a temporary alias, the temporary alias being associated with one or more expiration conditions, such that the temporary alias is replaced by a different temporary alias upon determining that the one or more expiration conditions have been met;
present the temporary alias on a display of the client device in a list of potential origination aliases; and
upon receiving a selection of the temporary alias to complete a transaction:
transmit the temporary alias to the application server;
receive the cryptocurrency address; and
generate a transfer request using the cryptocurrency address.

8. The client device of claim 7, wherein the different temporary alias is displayed in the list of potential origination aliases upon the temporary alias being replaced by the different temporary alias.

9. The client device of claim 7, wherein the transfer request is signed using a private key stored in a secure memory of the client device.

10. The mobile device of claim 7, wherein the instructions further cause the client device to:
receive input related to a target alias;
transmit the target alias to the application server; and
receive a second cryptocurrency address associated with the target alias, the transfer request being generated using the second cryptocurrency address.

* * * * *